Patented June 20, 1950

2,512,418

UNITED STATES PATENT OFFICE 2,512,418

ADHESIVES FROM BLOOD HEMOGLOBIN, FORMALDEHYDE, AND ETHYLENE DIAMINE

Carl D. Cornwell, Downers Grove, Ill., assignor to Armour and Company, Chicago, Ill., a corporation of Illinois No Drawing. Application December 9, 1947, Serial No. 790,715

12 Claims. (Cl. 260—6)

1

This invention relates to adhesives. The invention is useful in thermosetting adhesives and in adhesives formed separately in parts, the parts being combined in the final bonding operation. The invention is further particularly useful in connection with adhesives suitable for use in the manufacture of laminated wood timbers and the like, and with processes for preparing the adhesive. The invention is further useful in connection with such bonded structures and the processes of forming the bond. The present invention further lends itself readily to the use of high radio frequencies in the final thermosetting and curing stage.

Heretofore two principal types of adhesives have been used commercially in the manufacture of laminated wood structures. These are casein compositions and resorcin resins.

The casein adhesives have been widely used, but they are not very satisfactory because they do not produce a waterproof bond and the laminated structures which have been bonded with casein adhesives cannot be used where they are exposed to the weather.

The resorcin resins produce strong bonds which have waterproof qualities. However, the resorcin resin bonds are quite rigid and offer considerable resistance to cutting tools. Also, they are somewhat brittle and subject to rupture through shock. They are quite expensive and are economically adaptable only in special kinds of manufacture. It would be very desirable to provide a suitable adhesive from readily available materials by simple methods so that the adhesive could be produced in volume for large scale usage.

An object of the present invention is to provide an adhesive of the character set forth which is thermosetting at relatively low temperatures and which produces a strong bond having highly water-resistant qualities and having somewhat elastic characteristics when wet. Yet another object is to provide an adhesive in which the component elements are segregated in two parts, the parts being brought together just before use to form a highly effective bonding material, the segregated component parts being easily preserved over long periods and under difficult conditions while maintaining their desirable characteristics. A still further object is to provide an adhesive which responds unusually well to the action of high frequency radio waves in the thermosetting stage. Other specific objects and advantages will appear as the specification proceeds.

In one embodiment of my invention, I utilize a chemical combination produced through the reaction of blood hemoglobin, and an aldehyde in the presence of a peroxide catalyst. The peroxide may be organic or inorganic. Barium peroxide has been found to be particularly useful. The peroxide probably acts as a catalyst to the spreading of the heat uniformly and quickly through a glue line. It affects the cure favorably and it greatly reduces the arcing characteristics of the material when the material is subjected to high frequency radio waves in the thermosetting operation.

The blood hemoglobin may be applied to the process in whole animal blood from cattle, hogs, sheep, etc., or in any blood fraction, which contains appreciable amounts of hemoglobin. I prefer to use blood fractions which contain a higher percentage of hemoglobin than is contained in the natural whole blood. The hemoglobin may be in liquid or dry form. Conveniently I may utilize the commercial dried hemoglobin which is the fraction of whole blood remaining after separation of the light or albumin fraction. In compounding the adhesive, the hemoglobin may be used in aqueous solution, the concentration of which may vary widely, the hemoglobin being for example 10–70% on a dry basis. Whenever amounts of hemoglobin are indicated in this specification and claims, the amounts may be taken as on a dry basis.

The aldehyde is preferably formaldehyde, suitably in the form of paraformaldehyde since in this form it is liquid at atmospheric pressures. Any other aldehyde, for example, acetaldehyde, may be used. The aldehyde is used with other substances, such as polyamines, as will now be described.

Any polyamine may be employed, including diamines, triamines, both aliphatic and aromatic. Preferably I use an alkyl amine and I find ethylene diamine to be particularly effective.

The above thermosetting adhesive consisting of blood hemoglobin, an aldehyde, and a peroxide, has been found to be highly satisfactory. It may be used in this simple form or additives may be supplied. A very satisfactory specific product is produced by the combining of blood hemoglobin, barium peroxide, and an aldehyde polyamine condensate, such as paraformaldehyde ethylene diamine condensate.

I have further found that the product is greatly improved from the standpoint of preventing arcing in the use of radio frequency bonding equipment by adding iron-containing materials to the mixture. The iron present in such additives and also present in the blood hemoglobin presents a conductive field and makes for a more rapid, selective, and uniform passage of current through the glue line. This speeds up cures and lowers the tendency of the current to channel, which is one cause of arcing. An unusually effective material for adding to the adhesive and containing iron is sienna, a powdered iron oxide bearing clay. Sienna may be used in various forms, but I prefer to employ raw sienna. The sienna improves the physical mixing of the segregated parts of the adhesive, as will be later described, and at the same time improves the water resistance of the cured bonds. The presence of the sienna definitely improves the gluing operation when using high frequency current. Why sienna is so effective in producing an adhesive that operates so satisfactorily under high frequency current, I cannot explain with certainty. It may be that the iron particles in the raw sienna are serving as carriers of the oxygen which is set free from the barium peroxide at the time of bonding, or it may be that the iron simply provides a more conductive field and thus, because it is uniformly dispersed, makes for a rapid, selective, and uniform passage of the current through the glue line, lowering the tendency of the current to channel and thus produce arcing.

One difficulty in the handling of blood hemoglobin and other constituents is that they do not remain stable over long periods of time and ingredients are required to preserve the product. Even with added ingredients, the product is not one of long life. I have found that if the blood hemoglobin be segregated in a dry mixture while at the same time other ingredients be segregated in a liquid mixture, that a highly effective product is obtained and one which will last for extremely long periods of time. In my improved process and product, I prefer to use powdered hemoglobin in mixtures with dry barium peroxide and the sienna in one segregated part. To this mixture may be added a filler, such as walnut shell flour, powdered bone meal, etc. I prefer to employ walnut shell flour because of its ability to fill the small irregularities in and between the adjoining surfaces to be bonded. Also, with the dry mixture may be included paraffin oil which reduces the dusting characteristics of the dry powder. For the purpose of clarity, the first segregated part consisting of the above ingredients may be designated as Part A.

The liquid mixture employed may be designated as Part B and it preferably includes the aldehyde and polyamine. Excellent results are obtained when the mixture contains ethylene diamine and paraformaldehyde. Various other ingredients may be added, as, for example, ethylene glycol, ethyl mercury phosphate (Lignasan), and tributyl phosphate. Tributyl phosphate in Part B serves as a defoamer in the use of the final finished product.

As an example of one product, Part A may include powdered hemoglobin and barium peroxide, while Part B may include the polyamines and aldehyde (preferably ethylene diamine and paraformaldehyde).

As a further example, the product described above may be modified by adding to Part A raw sienna. I prefer also to add a filler to Part A, preferably walnut shell flour.

As a further example, the dry mixture containing powdered blood hemoglobin, filler, raw sienna, and barium peroxide is mixed with a liquid Part B containing an aldehyde and polyamine (preferably ethylene diamine and paraformaldehyde), and to this mixture may be added ethylene glycol, ethyl mercury phosphate, and tributyl phosphate, if desired.

In the mixing of the component parts in Part A, I prefer to follow a procedure which reduces any hazard in the use of barium peroxide and which gives an excellent final dry product. For example, 33 pounds of walnut shell flour are mixed with 15.6 pounds of raw sienna and 3 pounds of paraffin oil, thus making up a batch of 51.6 pounds. This batch is mixed in a mechanical mixer and then put through a hammer mill.

I next mix in a separate batch 55 pounds of powdered blood hemoglobin with 17¼ pounds from the above batch containing 51.6 pounds, and to the new mixture I add 1¾ pounds of barium peroxide. The resulting batch contains 74 pounds and makes up Part A of the mixture. In the final formula, three of such batches make up one 222 pound unit of Part A.

In the above procedure, it will be noted that the barium peroxide is not subjected to the action of the mechanical mixer and is not passed through the hammer mill. The resulting Part A unit contains the following proportions of ingredients:

|   | Pounds |
|---|---|
| Powdered hemo | 165.0 |
| Walnut shell flour | 33.0 |
| Raw sienna | 15.6 |
| Barium peroxide | 5.4 |
| Paraffin oil | 3.0 |
|   | 222.0 |

Part B is preferably also prepared in two separate batches, and these will be designated as B1 and B2 as follows:

|   | Pounds |
|---|---|
| Ethylene glycol | 200 |
| Tributyl phosphate | 8 |
| Lignasan | 15 |
|   | 223 |

Part B1 should preferably be prepared at least 24 hours before using in order to permit the inert material in the Lignasan to settle out. The clear liquor is then decanted or carefully dipped off to be later used in Part B2, which is prepared as follows:

The preparation of Part B2 is important and calls for the presence of certain conditions. It should be prepared in a jacketed glass-lined container which is cooled with Dry Ice or its equivalent. The inert container is preferably fitted with an agitator which is operated at a moderate speed. A one-third horsepower mixer in a 25 or 30 gallon container operating at 440 revolutions per minute is satisfactory. The batch contains:

| | Pounds |
|---|---|
| Clear solution from B₁ | 50 |
| Ethylene diamine | 50 |

The above mixture is cooled to a temperature of about 20–25° C., and to it are slowly added 37 pounds of paraformaldehyde. During the addition of the paraformaldehyde, the temperature of the batch preferably should not drop below 15° C. nor rise above 30° C. After all of the paraformaldehyde has been added, I then add 123 pounds of the clear solution from B₁. The total batch contains 260 pounds.

Eighty pounds of the above batch of Part B is the correct amount to go with one 220 pound batch of Part A, thus making up a total of 300 pounds of the adhesive.

The composition of the B part of a 300 pound unit would then be:

| | Pounds |
|---|---|
| Ethylene glycol | 47.7 |
| Tributyl phosphate | 1.9 |
| Lignasan | 3.6 |
| Ethylene diamine | 15.4 |
| Paraformaldehyde | 11.4 |
| Unit of Part B | 80.0 |

On the basis of 1,000 pounds, the components of the adhesive may be set out as follows:

*Part A*

| | Pounds | |
|---|---|---|
| Powdered hemoglobin | 550 | |
| Walnut shell flour | 110 | |
| Barium peroxide | 18 | |
| Raw sienna | 52 | |
| Paraffin oil | 10 | |
| | | 740 |

*Part B*

| | Pounds | |
|---|---|---|
| Ethylene glycol | 155 | |
| Ethylene diamine | 50 | |
| Paraformaldehyde | 37 | |
| Lignasan | 11 | |
| Tributyl phosphate | 7 | |
| | | 260 |
| | | 1,000 |

In the use of the adhesive Parts A and B, it is desired to mix with the dry Part A a portion of water sufficient to form a liquid mixture, and finally to mix the two liquid parts.

In adapting the material to the electronic gluing of soft woods, such as Douglas fir, the following procedure may be followed:

One hundred parts of cold water are mixed with 35 parts of liquid B. To this mixture are then added 100 parts of Part A powder. The mixture is stirred gently until the powder becomes wet throughout, and the mixture is allowed to stand 30 to 45 minutes, the mixture being stirred intermittently. Finally, it is desired to agitate to remove any remaining lumps. While still stirring, it is desired to add about 50 parts of cold water, depending upon the consistency desired for spreading. The adhesive is now ready for use.

The adhesive in the glue line is preferably heated to about 185° F. to effect a cure. However, higher temperatures, say, from 200° to 240°, are at times found desirable. The pressure during the cure should be preferably 100 pounds per square inch or above. The length of time in the electronic field may vary from a few seconds up to about one minute, depending upon the work and the facilities provided. The assembly time may range over a relatively long period. It may be as short as one minute or as long as twenty minutes when closed. Open assembly should not exceed seven minutes if drying of the glue film becomes noticeable.

In connecting wood strips, it is preferred to have wood with a moisture content of from 6 to 15%, and it is preferred to have the joints held at room temperature for at least 24 hours or until moisture equilibrium is established, before being subjected to shear tests.

While in the foregoing specification, I have set forth ingredients in specific detail for the purpose of illustrating satisfactory finished adhesive products, it will be understood that many of said ingredients are merely desirable but not necessary components and may be omitted if desired, and further that the details in the formulas given and in the processes set out may be varied widely by those skilled in the art without departing from the spirit of my invention.

I claim:

1. An adhesive comprising the reaction product of blood hemoglobin, paraformaldehyde, and ethylene diamine in the presence of barium peroxide.

2. A process for preparing an adhesive which is thermosetting, comprising reacting blood hemoglobin with paraformaldehyde ethylene diamine condensate in the presence of barium peroxide.

3. A process for preparing an adhesive which is thermosetting, comprising mixing raw sienna with a reaction product of blood hemoglobin and a paraformaldehyde ethylene diamine condensate in the presence of barium peroxide.

4. A process for preparing an adhesive product in two parts, comprising forming a dry mixture of powdered hemoglobin, filler, raw sienna, barium peroxide, and a small amount of paraffin oil, forming a separate mixture of ethylene glycol, ethylene diamine, paraformaldehyde, ethyl mercury phosphate, and tributyl phosphate, adding water to the dry mixture, and combining the mixtures.

5. An adhesive comprising the reaction product of blood hemoglobin, formaldehyde, and ethylene diamine in the presence of barium peroxide.

6. An adhesive comprising sienna and the reaction product of blood hemoglobin, paraformaldehyde, and ethylene diamine in the presence of barium peroxide.

7. An adhesive comprising raw sienna and the reaction product of blood hemoglobin, paraformaldehyde, and ethylene diamine in the presence of barium peroxide.

8. A process for preparing a liquid adhesive which is thermosetting, comprising combining a dry mixture of blood hemoglobin and barium peroxide with a liquid mixture comprising paraformaldehyde and ethylene diamine.

9. A process for preparing a liquid adhesive which is thermosetting, comprising combining a dry mixture of powdered blood hemoglobin, sienna, and barium peroxide with a liquid mixture consisting of paraformaldehyde, and ethylene diamine condensate.

10. A process for preparing a liquid adhesive which is thermosetting, comprising combining a dry mixture of powdered hemoglobin, walnut shell flour, raw sienna and barium peroxide with a liquid mixture of ethylene glycol, ethylene diamine, paraformaldehyde, ethyl mercury phosphate, and tributyl phosphate.

11. A process for preparing a liquid adhesive which is thermosetting, comprising mixing sienna with a reaction product of blood hemoglobin, formaldehyde, and ethylene diamine in the presence of barium peroxide.

12. A process for preparing a liquid adhesive which is thermosetting, comprising reacting blood hemoglobin and a formaldehyde ethylene diamine condensate in the presence of barium peroxide.

EARL D. CORNWELL.

REFERENCES CITED

The following references are of record in the file of this patent:

UNITED STATES PATENTS

| Number | Name | Date |
|---|---|---|
| 932,527 | Wiechmann | Aug. 31, 1909 |
| 1,786,488 | Homberg | Dec. 30, 1930 |
| 2,056,456 | Howald | Oct. 6, 1936 |
| 2,191,802 | Novotny et al. | Feb. 27, 1940 |
| 2,315,402 | D'Alelio | Mar. 30, 1943 |